(12) United States Patent
Mulhollan et al.

(10) Patent No.: US 8,298,029 B2
(45) Date of Patent: Oct. 30, 2012

(54) METHOD FOR RESURRECTING NEGATIVE ELECTRON AFFINITY PHOTOCATHODES AFTER EXPOSURE TO AN OXIDIZING GAS

(76) Inventors: Gregory A. Mulhollan, Austin, TX (US); John C. Bierman, Austin, TX (US)

( * ) Notice: Subject to any disclaimer, the term of this patent is extended or adjusted under 35 U.S.C. 154(b) by 0 days.

(21) Appl. No.: 12/931,839

(22) Filed: Feb. 11, 2011

(65) Prior Publication Data

US 2011/0201244 A1   Aug. 18, 2011

Related U.S. Application Data

(60) Provisional application No. 61/338,085, filed on Feb. 16, 2010.

(51) Int. Cl.
*H01J 9/50* (2006.01)
(52) U.S. Cl. .................................. 445/2; 250/492.24
(58) Field of Classification Search . 445/2; 250/492.24, 250/214 VT, 492.2, 423 P; 313/542, 530, 313/541, 544
See application file for complete search history.

(56) References Cited

U.S. PATENT DOCUMENTS

| | | | |
|---|---|---|---|
| 6,476,401 B1 * | 11/2002 | Veneklasen et al. | 250/492.24 |
| 7,576,320 B2 * | 8/2009 | Bunker et al. | 250/286 |
| 2004/0232357 A1 * | 11/2004 | Fernadez et al. | 250/492.24 |

* cited by examiner

*Primary Examiner* — Anne Hines

(57) ABSTRACT

A method by which negative electron affinity photocathodes (201), single crystal, amorphous, or otherwise ordered, can be made to recover their quantum yield following exposure to an oxidizing gas has been discovered. Conventional recovery methods employ the use of cesium as a positive acting agent (104). In the improved recovery method, an electron beam (205), sufficiently energetic to generate a secondary electron cloud (207), is applied to the photocathode in need of recovery. The energetic beam, through the high secondary electron yield of the negative electron affinity surface (203), creates sufficient numbers of low energy electrons which act on the reduced-yield surface so as to negate the effects of absorbed oxidizing atoms thereby recovering the quantum yield to a pre-decay value.

12 Claims, 4 Drawing Sheets

METHOD FOR RESURRECTING NEGATIVE ELECTRON AFFINITY PHOTOCATHODES AFTER EXPOSURE TO AN OXIDIZING GAS

CROSS-REFERENCE TO RELATED APPLICATION

This application claims the benefit of PPA Ser. Nr. 61/338,085 filed Feb. 16, 2010 by the present investors, which is incorporated by reference.

FEDERALLY SPONSORED RESERCH

This work was supported by the Department of Energy SBIR under Grant No. DE-SC0002268.

FIELD OF THE INVENTION

The present invention relates to an alkali application-free method for recovering the photoyield of photocathodes previously activated to a state of lowered affinity and thereafter exhibiting a reduced response through the action of reactive gas. Specifically, the invention relates to a photoyield recovery method for those materials ordinarily employing alkali deposition for said recovery to employ a low energy electron beam to effect the desired change.

BACKGROUND

Negative electron affinity based photocathodes, often composed of group III-V elements, are used in many applications. In technological constructs, they are frequently employed as sensitive generators of photoelectrons fed into a cascade chain for signal amplification in photomultiplier tubes. Specialized negative electron affinity photocathode based tubes are used for low level light amplification in night-vision goggles and sights. Scientific applications include use as sources of spin-polarized, high intensity and/or duty cycle and ultra-cold electrons. In all cases, the photocathode is activated to lower its electron affinity, thereby enabling photoelectrons to be emitted via excitation by relatively low energy visible and near infrared photons.

Activated photocathodes are restricted to operation in the very best ultra-high vacuum environments so that they exhibit stable operation over long periods. In sealed tubes, exposure is limited to gas generated from internal components through electron bombardment and heating. When used as a bolt-on electron source in an open system, the gas load may be compounded by connection to vacuum systems with higher pressures than the source. A major problem in the preparation and use of these photocathodes is the relatively high chemical reactivity of both the clean and activated III-V photocathode surfaces. Recently, there has been an advance in activation process methodology to enhance the chemical immunity of activated III-V photocathodes. Regardless of the activation method used, all photoemitters exhibit loss of photoyield with time due to interaction with the background gas. In open systems, this can be particularly egregious. To maintain the photoemitter's photoyield at a usable level, the standard, conventional method is to apply additional cesium to the surface, thereby partly restoring the photoyield to a substantial fraction of the maximum achieved during the activation process. The availability and/or presence of free cesium in an operational environment may be mechanically difficult to achieve or result in high voltage breakdown. Prior to this invention, no satisfactory alternate method had been developed so that GaAs and other III-V based photoemitters could have their photoyield recovered in an alkali application-free fashion.

GaAs photoemitters are activated to the negative electron affinity state by first starting with an atomically clean surface. Such a surface is obtained by chemical treatment, frequently followed by heating once the photoemitter has been introduced into a vacuum environment. Activation consists of the deposition of a low work function metal, such as a group IA alkali, followed or interleaved with an oxidizing agent onto the clean surface. The lowest affinities are obtained using cesium as the alkali and either oxygen or nitrogen trifluoride as the oxidizer. Studies of the photoyield decay process have shown that the oxidizer absorption sites' numbers and initial stoichiometry can change with further gas exposure causing the photoyield to decrease. Low energy electrons are well understood to possess the correct reactivity to induce electron stimulated desorption. Together these facts suggest that if a diminished photoyield photocathode were exposed to a low energy electron beam, the subtle surface chemical reactions that led to the diminished photoyield may be reversed.

An alkali application-free recovery and resurrection method would have great utility in many applications of lowered and negative electron affinity based photocathodes. Decreased alkali introduction into high electric field structures would enhance the shelf- and operational-lifetimes of these devices by reducing the probability of field emission induced breakdown. Photocathodes in sealed systems lacking an alkali source could be rejuvenated using this new methodology by employing the photocathode as its own electron source and impinging the photogenerated electrons back upon the photocathode's surface via reflection or redirection by application of pulsed voltages.

SUMMARY OF THE INVENTION

An object of the invention is to overcome at least some of the drawbacks relating to the methods of prior art as discussed above.

Hence, a method is provided by which photocathodes, single crystal, amorphous, or otherwise ordered, can be resurrected to a state of lowered and in best cases negative, electron affinity through application of a low energy electron beam. Conventional methods employ the use of cesium to effect said recovery. In the improved recovery method, a low energy electron beam is introduced at the start of the recovery process, either from an external thermionic electron source, an external field emission source, an external photoemission source, an external secondary electron source or through reflection, redirection or recirculation of photo- or otherwise-generated electrons onto the surface of the photocathode. Suitable photocathodes are those which are grown, cut from boules, implanted, rolled, deposited or otherwise fabricated in a fashion and shape desired for test or manufacture independently supported or atop a support structure or within a framework or otherwise affixed or suspended in the place and position required for use. The ensuing recovery process has been shown to provide similar effects on the photoyield at the band gap and away from the band gap as does the conventional alkali deposition recovery technique.

Carbon dioxide is a gas known to have an extremely deleterious effect on the photoyield of photocathodes, especially those based on the III-V column elements, e.g., GaAs. For background gas levels in the ultra-high vacuum range, photoemitters exhibit no yield change on the time scale of hours. For exposure to carbon dioxide at the 1.0E-11 Torr level or greater, the photoyield will decay at an enhanced rate. Rejuvenation of photocathodes after such exposure has been shown to be equivalent for both the old, standard method and the new, improved alkali application-free method. The photoyield improvement with the alkali application-free method, over the range of yields that are used or outside the range of interest, is brought about by changing the surface chemistry through interaction with low energy electrons. The yield is not necessarily improved over all possible emission wavelengths. The low energy electron beam can be supplied by a thermionic source, either directly or indirectly heated, as found in commercial shown. Indeed, these inventions may be embodied in many different forms and should not be construed as limited to the embodiments set forth herein; rather, these embodiments are provided by way of example so that this disclosure will satisfy applicable legal requirements. Like numbers refer to like elements throughout.

FIG. 1 illustrates the conventional photoyield recovery process via application of the alkali cesium onto activated GaAs 201 using the methods familiar to practitioners of the art. The abscissa 101 represents time and the ordinate 103 represents the photoelectron quantum yield, or photoyield, as measured in reflection mode using a helium neon laser with a wavelength of 632.8 nm as the light source. The abscissa 101 encompasses a range of 10 minutes. The ordinate 103 covers a range of 0.0 to 1.0 in photoyield, expressed in arbitrary units. The photoyield as a function of time as obtained from single crystal GaAs 201 with an orientation of (001), using standard activation methods employing cesium and nitrogen trifluoride in the activation layer 203, comprises the first curve 102. For the conventional photoyield recovery method, cesium is applied, using methods familiar to practitioners of the art, at an arbitrary time 104 resulting in an increase in the photoyield and an eventual maximum 106. For greater longevity, the photocathode has an excess of cesium applied which diminishes the photoyield at first 108, but results in an overall greater period between the required cesium applications.

Turning now to FIG. 2, the method and mechanism of electron beam 205 induced photoyield rejuvenation and several embodiments of the electron delivery method are shown. GaAs photoemitters 201 are activated to the negative electron affinity state by first starting with an electron guns, a field emission source, a photoemissive or secondary electron source, or by redirected, reflected or recirculated electrons originating from the photocathode or otherwise.

In other aspects, the invention provides a method of photocathode rejuvenation having features and advantages corresponding to those discussed above.

BRIEF DESCRIPTION OF THE DRAWINGS

The present invention is illustrated by way of example and not limitation in the accompanying figures.

DETAILED DESCRIPTION OF THE INVENTION

Figure 1:
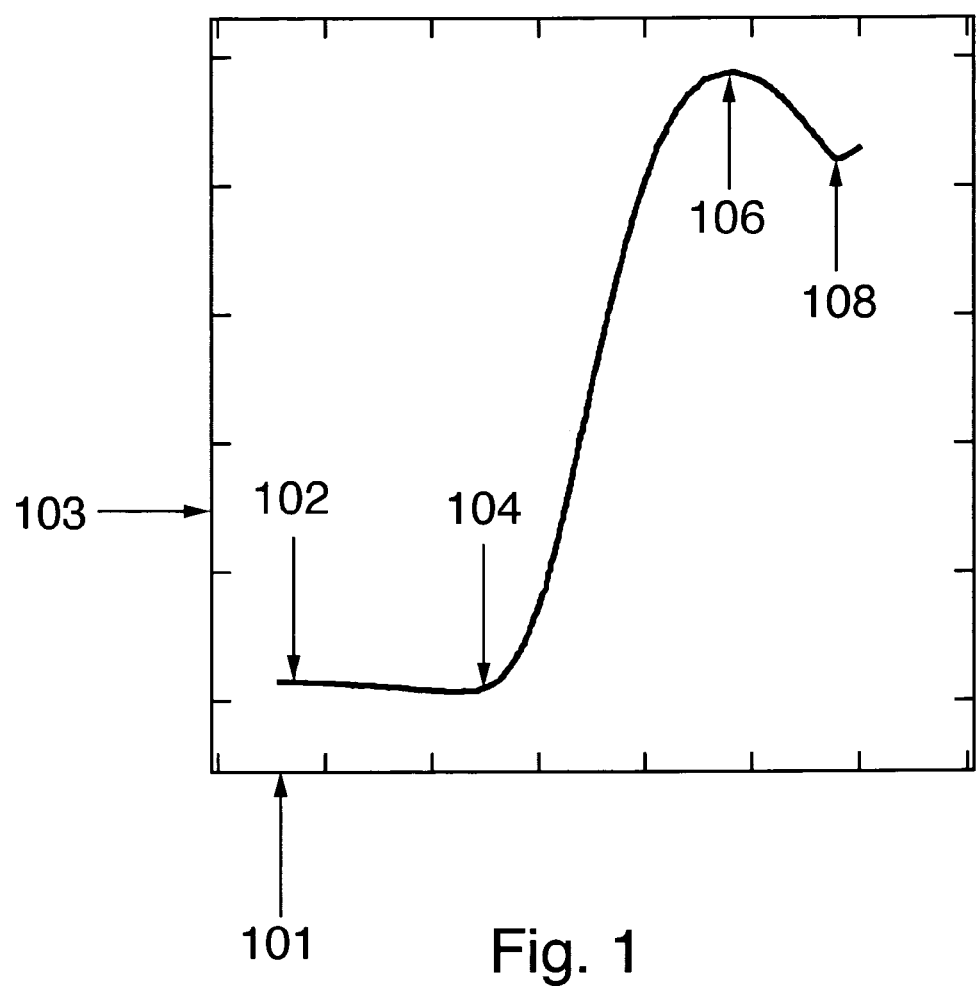
FIG. 1 shows conventional recovery of the photoyield using cesium deposition for bulk GaAs previously activated with cesium and nitrogen trifluoride and allowed to decay through background gas interaction.
Figure 2:
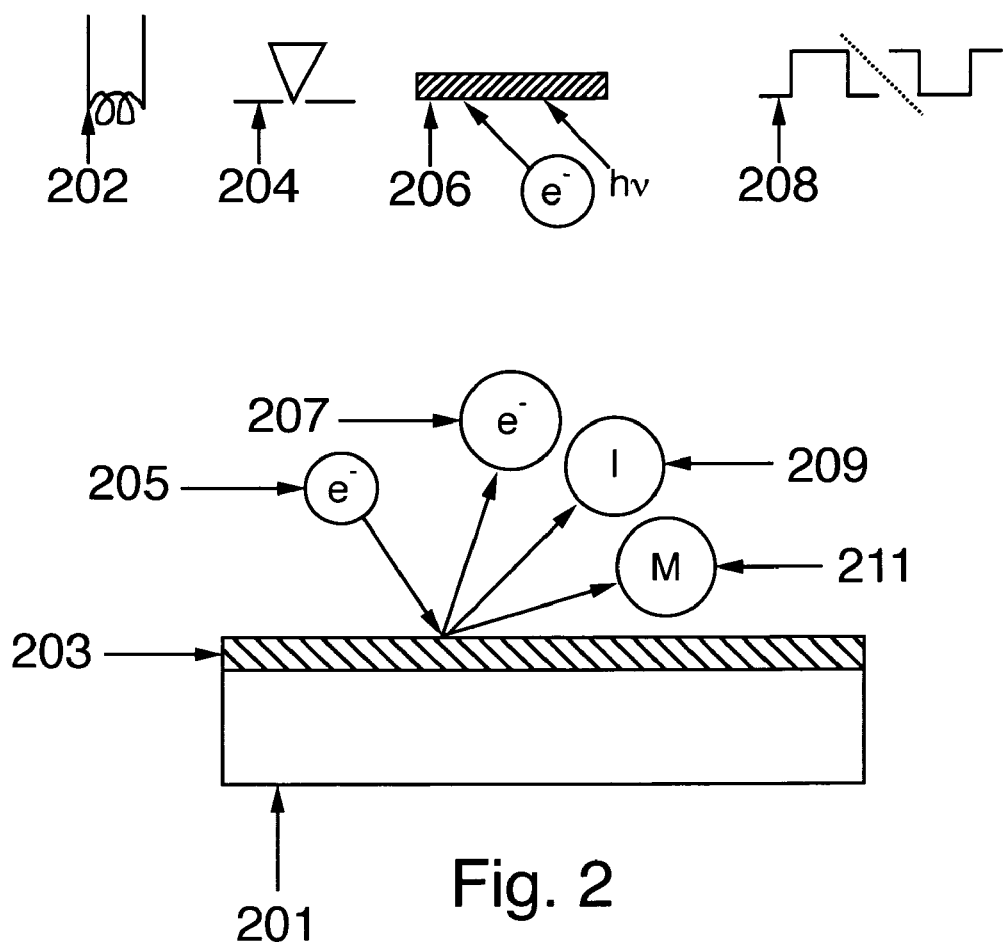
FIG. 2 schematically represents the electronic and chemical processes taking place during the recovery process and several embodiments of electron sources for use in the improved method.

The present inventions now will be described more fully hereinafter with reference to the accompanying drawings, in which some examples of the embodiments of the inventions are atomically clean surface. Such a surface is obtained by chemical treatment, frequently followed by heating once the photoemitter has been introduced into a vacuum environment. Activation consists of the deposition of a low work function metal, such as a group IA alkali, followed or interleaved with an oxidizing agent onto the clean surface resulting in an activation layer 203. The lowest electron affinities and thereby best activations with highest resultant photoyield are obtained using cesium as the alkali. Subsequent or concurrent exposure to oxidizing gasses, such as oxygen, carbon monoxide, carbon dioxide 304, nitrogen trifluoride, etc., will result in a diminished photoyield 306.

In this embodiment, the reduced photoyield photoemitter is rejuvenated by the application of a low energy electron beam 205 to the activated surface 203. If the incident electron beam possesses sufficient energy, a cloud of secondary electrons 207 will be generated. Due to the high secondary electron coefficient of negative electron affinity surfaces, the numbers of secondary electrons 207 can be one or more orders of magnitude greater than the number delivered by the incident electron beam 205. Via electron stimulated desorption, ions 209 and molecular fragments 211, either charged or neutral, will be emitted. The responsible electrons can be either those in the incident beam 205 or those generated at the surface 207 and having sufficient energy to effect the breaking of molecular bonds. Provided the correct incident beam energy is employed, the effect of the desorption process can be to rejuvenate the photoyield in a manner similar to that of the conventional method. The action of the incident electron beam 205 and secondary electrons 207 may also be to modify the activated surface 203 chemistry rather than inducing physical desorption. The requisite incident electron current 205 scales with the size of the photocathode 201 encapsulating volume.

Multiple methods are suitable for delivering the incident electron beam 205 to the activation layer 203. A thermionic emission electron source 202, either directly or indirectly heated, which forms the core of an electron flood gun, scanning electron gun or related source may be employed. A bare filament 202 is also suitable to provide the necessary electron beam 205 provided a sufficient bias between the filament 202 and the photocathode 201 is provided. A second embodiment of electron source delivery is the field emission type 204. This source of incident electrons has the advantage of devolving less gas than the thermionic emitter 202. An indirect source of incident electron beam 205 can be provided by electron or photon action 206 upon a surface not the photoemitter 201. The resultant secondary electrons and photoelectrons 206 can be generated as part of an existing system, removing the need to add additional hardware into volumes restricted by design or function. In a final embodiment, the incident electron beam 205 for the photocathode 201 rejuvenation can be generated by the photocathode 201. These photoelectrons can be returned to the photocathode surface 203 with suitably pulsed potentials 208 providing the requisite reflection, redirection or recirculation.

Figure 3:
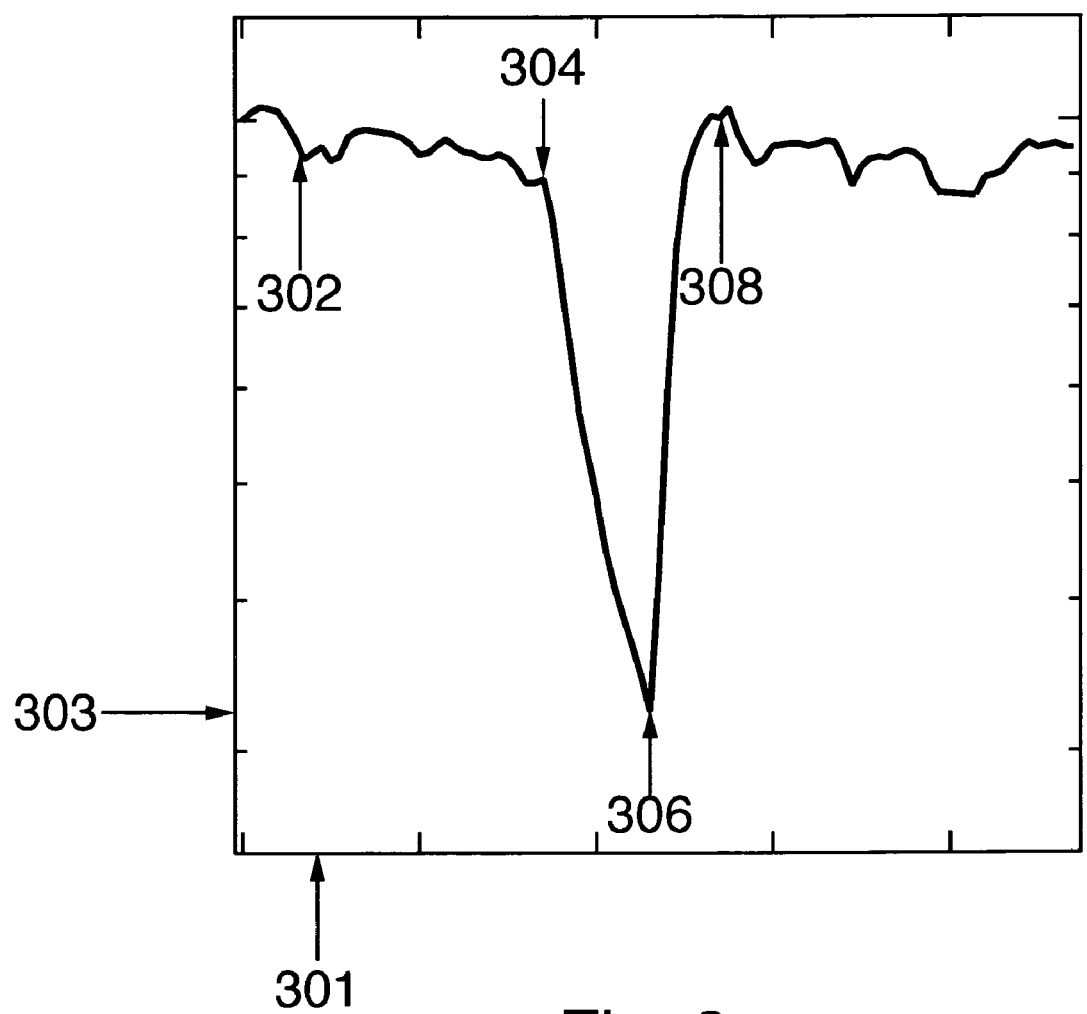
FIG. 3. shows an example of the improved recovery process when a previously activated photocathode has been exposed to carbon dioxide.

An example photoyield rejuvenation curve 302 incorporating the method for applying an incident electron beam 205 after deliberate exposure of the photocathode 201 to carbon dioxide 304 is illustrated in FIG. 3. The abscissa 301 represents time as measured on a strip-chart recorder or other time marking device and the ordinate 303 represents logarithmically the photoelectron current as measured in reflection mode using a light source having a wavelength of 632.8 nm. The abscissa 301 covers a period of 90 minutes. The ordinate 303 covers a photoyield range of 0.3 to 1.1 in arbitrary units. To separate out the photocurrent contribution from the secondary current 207 and that originating from the electron source 202, the light source was mechanically chopped with the resultant photocurrent detected by a phase sensitive amplifier. The direct current portion of the emitted electron 207 signal was used to control the incident electron source 202. The photoyield at the start of the measurement 302 had a small decay slope due to background gas exposure. Upon deliberate exposure to carbon dioxide 304, the photoyield was allowed to drop by a factor of three 306 before an incident electron beam 205 was applied to the activation layer 203. The resulting effect of the application of electrons from the incident beam 205 together with the internally generated secondary electrons 207 on the activation surface 203 was to rejuvenate the photoyield to the value it would have had in the absence of the carbon dioxide 308. This result is not obvious to practitioners of the art for the following reasons. First, photocathodes 201 are employed as electron sources, not as electron sinks. Aside from measurements on secondary electron 207 yield, there has been little motivation to subject photocathodes 201 to externally generated electron beams 205. Second, the rejuvenation effect 306 would not be seen in normal use since the excess energies of photogenerated electrons emitted from the photoemitter 201 for conventional reasons are too low to affect the requisite molecular bonds.

Figure 4:
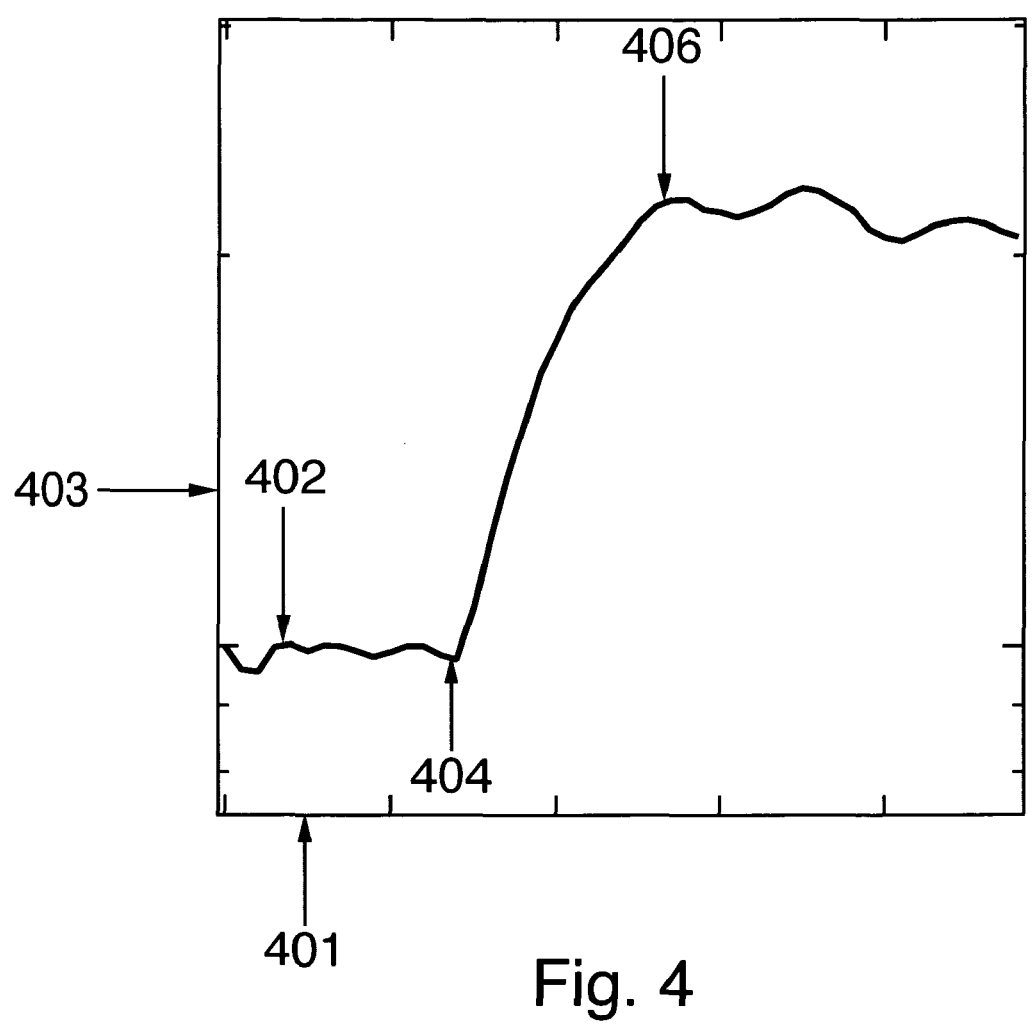
FIG. 4. shows an example of the improved recovery process when a previously activated photocathode has been allowed to undergo photoyield decay through background gas interaction.

FIG. 4 illustrates the photoyield rejuvenation process measured from GaAs 201 activated using the methods familiar to practitioners of the art. The abscissa 401 represents time as measured on a strip-chart recorder or other time marking device and the ordinate 403 represents logarithmically the photoelectron current as measured in reflection mode using a light source having a wavelength of 632.8 nm. The abscissa 401 covers a period of 50 minutes. The ordinate 403 covers a range of photoyield range of 0.3 to 1.1 in arbitrary units. To separate out the photocurrent contribution from the secondary current 207 and that originating from the electron source 202, the light source was mechanically chopped with the resultant photocurrent detected by a phase sensitive amplifier. The direct current portion of the emitted electron 207 signal was used to control the incident electron source 202. After being allowed to decay for three days from background gas exposure, the photoyield change with time at the start of the measurement 402 very small. An incident electron beam 205 was directed onto the activation layer 203 with a resultant secondary electron 207 current of 25 microamps. The effect of the application of electrons from the incident beam 205 together with the internally generated secondary electrons 207 on the activation surface 203 was to rejuvenate the photoyield to near the value it would have had in the absence of any decay. To practitioners of the art familiar with the use of cesium alone for rejuvenating GaAs, this result is unobvious.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

The invention claimed is:

1. A method of restoring the performance of an alkali activated semiconductor photocathode, the method comprising:
providing a low energy electron beam incident upon an area of interest of an exposed surface of the photocathode, wherein the electron beam causes reversal of photocathode degradation induced by chemisorption.

2. The method according to claim 1, wherein the electron beam has energy between 1 and 10 electron volts.

3. The method according to claim 1, wherein the electron beam has energy between 10 and 100 electron volts.

4. The method according to claim 1, wherein the electron beam has energy between 100 and 1000 electron volts.

5. The method according to claim 1, wherein the electron beam has energy between 1000 and 5000 electron volts.

6. The method according to claim 1, wherein the electron beam is entirely delivered by an external source.

7. The method according to claim 1, wherein the electron beam is partly provided by secondary electrons generated within the photocathode.

8. The method according to claim 1, wherein the electron beam is provided by a thermionic emission source.

9. The method according to claim 1, wherein the electron beam is provided by a field emission source.

10. The method according to claim 1, wherein the electron beam is provided by secondary electrons generated at a surface that is not the photocathode.

11. The method according to claim 1, wherein the electron beam is provided by a photoemission source that is not the photocathode.

12. The method according to claim 1, wherein the electron beam is generated by photoemission from the photocathode and redirected, reflected or recirculated to the photocathode surface.

* * * * *